(12) United States Patent
Farese et al.

(10) Patent No.: US 7,568,507 B2
(45) Date of Patent: Aug. 4, 2009

(54) DIAGNOSTIC METHOD AND APPARATUS FOR A PRESSURIZED GAS SUPPLY SYSTEM

(75) Inventors: David John Farese, Riegelsville, PA (US); Todd Eric Carlson, Allentown, PA (US); Joseph Perry Cohen, Bethlehem, PA (US); Amanda Elizabeth Witmer, Allentown, PA (US); Keith H. Schultz, New Tripoli, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 286 days.

(21) Appl. No.: 11/295,222

(22) Filed: Dec. 6, 2005

(65) Prior Publication Data

US 2007/0125441 A1 Jun. 7, 2007

(51) Int. Cl.
*B65B 57/00* (2006.01)
(52) U.S. Cl. ............... 141/95; 141/4; 141/197
(58) Field of Classification Search ............ 141/4, 141/96, 105, 197, 95
See application file for complete search history.

(56) References Cited

U.S. PATENT DOCUMENTS

| | | | |
|---|---|---|---|
| 5,029,622 A | | 7/1991 | Mutter |
| 5,238,030 A | | 8/1993 | Miller et al. |
| 5,406,988 A | * | 4/1995 | Hopkins ............... 141/2 |
| 5,513,678 A | | 5/1996 | Schultz et al. |
| 5,570,729 A | | 11/1996 | Mutter |
| 5,628,349 A | * | 5/1997 | Diggins et al. .......... 141/3 |
| 5,694,985 A | * | 12/1997 | Diggins ............. 141/4 |
| 5,868,176 A | | 2/1999 | Barajas et al. |
| 5,881,779 A | | 3/1999 | Kountz et al. |
| 5,901,748 A | | 5/1999 | Jessop |
| 6,598,624 B2 | | 7/2003 | Togasawa et al. |
| 6,779,568 B2 | | 8/2004 | Borck |
| 6,786,245 B1 | | 9/2004 | Eichelberger et al. |
| 6,788,209 B2 | * | 9/2004 | Cothern et al. ....... 141/198 |
| 7,152,637 B2 | * | 12/2006 | Hoke, Jr. ............ 141/192 |
| 2004/0146762 A1 | * | 7/2004 | Simpson et al. ....... 429/22 |
| 2004/0163731 A1 | | 8/2004 | Eichelberger et al. |
| 2004/0237631 A1 | * | 12/2004 | Cohen et al. ......... 73/40.7 |

FOREIGN PATENT DOCUMENTS

| | | |
|---|---|---|
| EP | 0 093 275 A2 | 11/1983 |
| EP | 0 653 585 A1 | 5/1995 |
| EP | 1 336 795 A2 | 8/2003 |
| WO | 95/30110 | 11/1995 |

* cited by examiner

*Primary Examiner*—Timothy L Maust
*Assistant Examiner*—Nicolas A Arnett
(74) *Attorney, Agent, or Firm*—Keith D. Gourley

(57) ABSTRACT

A diagnostic method for a gas supply system includes: determining a desired ramp rate for filling a vessel from a supply of compressed gas; monitoring the actual pressure of gas entering the vessel; and discontinuing the flow of gas into the vessel when the actual pressure deviates from the intended pressure at the desired ramp rate by an undesired amount. A system for carrying out the method includes a flow controller for controlling operation of the supply system to deliver compressed gas from a source to a vessel through a supply line at a desired ramp rate. The system employs a pressure monitor downstream of a control valve for measuring the pressure of gas directed into the vessel and transmitting pressure-related data to the flow controller, which closes the control valve to discontinue filling of the vessel if the actual pressure exceeds a permissible deviation from the intended pressure.

17 Claims, 5 Drawing Sheets

DIAGNOSTIC METHOD AND APPARATUS FOR A PRESSURIZED GAS SUPPLY SYSTEM

BACKGROUND OF THE INVENTION

This invention relates generally to a system for delivering compressed gas to a receiving tank or vessel and more specifically to a diagnostic method and apparatus for shutting off the gas supply to the vessel if, during the fill cycle, the pressure of the gas in the vessel deviates by an undesired amount from the intended pressure at a desired ramp rate (i.e., desired pressure increase in the fueling hose or line per unit time during the fill cycle). The desire ramp rate directly relates to the desired fill rate.

Numerous supply systems employed to fill a receiving tank or vessel with compressed gas are known in the art. These systems include cascade filling processes and systems that employ multiple high-pressure storage vessels to charge a lower pressure-receiving vessel or tank, as exemplified in Borck U.S. Pat. No. 6,779,568. The '568 patent discloses that, for a constant filling time, the peak temperature of the gas in the receiving tank will be lower when a lower pressure storage vessel is used first during the cascade filling process. Thus, the '568 patent teaches controlling the order in which the storage vessels are utilized based on the difference in pressure within those vessels.

It is also known that the temperature rise in a receiving tank can be limited by adjusting the filling rate, especially at the start of the filling process when the rate of temperature increase is the greatest, as exemplified by the teachings in Hwang, et al. U.S. Pat. No. 5,901,748 and Togasawa, et al. U.S. Pat. No. 6,598,624.

The above identified patents are only representative of the many types of gas supply systems disclosed in the prior art for filling a receiving tank or vessel.

It is highly desirable, and indeed very important that the flow rate of gas into the receiving tank or vessel be controlled to prevent overheating of the vessel. In addition, it is desirable to maintain the flow rate at a sufficient level to prevent an excessively long fill time; a situation adverse to the public adoption of gaseous vehicle fueling.

Thus, the operation of filling a receiving tank or vessel with compressed gas is a process in which the mass of gas directed into the tank or vessel and the total time for filling the tank or vessel should be optimized, as these latter variables impact on the instantaneous pressure and temperature in the receiving tank. If the filling rate is too high, the receiving tank can overheat. Overheating occurs as a result of both adiabatic compression of the gas, and, when the gas is hydrogen or helium, by the reverse Joule-Thompson effect. The heat of compression is partially offset by the isentropic expansion cooling within the storage vessel. Moreover, for gases other than hydrogen and helium, a conventional Joule-Thompson effect takes place, which can further mitigate against overheating resulting from the impact of adiabatic compression of the gas in the receiving tank. However, even when charging a receiving tank or vessel with gases other than hydrogen and helium, the adiabatic compression of gas in the receiving tank creates an overheating concern, thereby requiring that the fill rate be carefully controlled.

The control of the filling operation is complicated when the receiving tank or vessel does not include any instrumentation to provide data on instantaneous pressure and temperature of the gas within the tank or vessel. Under these circumstances, one approach to controlling the fill rate has been to adjust the filling rate based upon the ambient temperature, by actuating one or more control valves to regulate the flow rate of gas to the receiving tank. As shown in FIG. 5 of U.S. Pat. No. 6,786,245, assigned to the same assignee as the instant application, a programmable logic controller (PLC) can take information on pressure (from the supply hose, which indirectly measures or reflects the pressure in the receiving tank) and on ambient temperature, and then regulate the set rate of the programmable pressure regulator using a current/pressure (I/P) controller. Although this system can provide its intended function, the potential exists for malfunctions associated with the control valve, the PLC and/or the I/P controller. For example, the pressure regulator could fail to open the required amount to establish a desired fill rate, thereby resulting in a longer fill time than is desired to achieve the desired pressure in the receiving tank. More significantly, the control valve could also open more than the required amount, thereby creating an excessively high fill rate, creating an unsafe condition due to an excessive temperature rise within the receiving tank. Since the system disclosed in the '245 patent does not include any feedback loop from the receiving tank, the above and other malfunctions in the supply system can go undetected.

U.S. Patent Application 2004/0163731, assigned to the same assignee as the instant application, discloses a gas filling system, but without the ability to monitor the fill rate in relation to set limits and to discontinue the filling operation if the fill rate is outside of the preset limits.

In the loading of compressed natural gas (CNG), U.S. Pat. No. 5,238,030 discloses the action taken by a fueling system when the time variation of the outlet pressure exceeds a certain predetermined limit, which would indicate a "sudden" loss of outlet pressure (e.g., due to the rupture of the dispensing hose).

U.S. Pat. No. 5,029,622 describes a CNG fueling system, including alterations to the operating state of the system when the pressure measurement deviates from a set value; that deviation being determined based upon a change in ambient temperature.

In summary, a number of supply systems include various devices and techniques for controlling the fill rate of gas into a receiving tank or vessel. However, until the present invention, there has not been an effective way for detecting a malfunction resulting in an unacceptably fast or unacceptably slow fill rate without the use of feedback instrumentation on the receiving tank. As is discussed in detail hereinafter, the present invention employs a self diagnostic method and apparatus for detecting when the fill rate is outside of a desired range, thereby signaling a possible malfunction of the supply system and shutting off the gas supply to the receiving tank when such a condition is detected.

BRIEF SUMMARY OF THE INVENTION

In accordance with both the method and apparatus of this invention information available from a pressurized-gas supply system is employed to prevent either an excessively fast or excessively slow fill rate to a receiving tank, without the use of feedback instrumentation on the receiving tank. It is extremely important to prevent an excessively fast fill rate, which is reflected by an undesirably high gas pressure in the vessel; creating a dangerous overheating condition. It is of less concern if the fill rate is too slow. If the fill rate is too slow, it can take an undesirably long period of time to fill the vessel or tank, which although undesirable will not damage the system or otherwise create an unsafe condition. Thus, in accordance with the broadest aspects of this invention the apparatus and method utilizes information available from a pressurized-gas supply system to prevent an excessive pressure rise in the receiving tank; thereby preventing a potentially dangerous overheating problem.

A preferred diagnostic method in accordance with this invention includes the steps of determining a desired ramp rate for filling a gas-receiving vessel from a supply of compressed gas; monitoring the pressure of gas in the receiving vessel during the filling of the gas-receiving vessel; and discontinuing the flow of gas into the receiving vessel in the event that the pressure being monitored deviates by an undesired amount from an intended pressure at the desired ramp rate.

Reference through this application to the pressure of gas "in" the receiving vessel or tank includes within its scope the pressure of gas within a supply line feeding the gas into the vessel or tank and having a gas pressure therein closely approximating the gas pressure in the tank or vessel.

Reference through this application to the pressure being monitored deviating "by an undesired amount" from an intended pressure, or words of similar import, includes pressures either at or exceeding a predetermined amount, unless otherwise specifically indicated.

In a preferred embodiment of this invention the step of determining the desired ramp rate is carried out based upon the ambient temperature.

In a preferred method of this invention the step of monitoring the actual gas pressure in the vessel during the full cycle is carried out by continuously monitoring the pressure of gas being directed into the receiving vessel.

A preferred method includes the step of employing a controller to compare the continuously monitored pressure of gas being directed into the receiving vessel or tank with the intended pressure at a desired ramp rate and to discontinue the flow of gas into the receiving vessel in the event the actual pressure deviates from the intended pressure by an undesired amount.

In a preferred method of this invention, the step of discontinuing the flow of gas into the receiving vessel is carried out by discontinuing the flow of gas only after the actual pressure deviates from the intended pressure at the desired ramp rate by an undesired amount for a predetermined period of time; preferably a continuous period of time.

In accordance with one embodiment of this invention, the amount of permissible deviation between the actual gas pressure in the receiving vessel or tank and the intended gas pressure at the desired ramp rate is a percentage deviation from the intended pressure.

In accordance with another aspect of this invention the amount of permissible deviation between the actual gas pressure in the receiving vessel or tank and the intended gas pressure at the desired ramp rate is a percentage deviation both above and below the intended pressure.

In accordance with another embodiment of this invention the amount of permissible deviation between the actual gas pressure in the receiving vessel or tank and the intended gas pressure at the desired ramp rate is a fixed percentage deviation from the intended gas pressure.

In accordance with another embodiment of this invention the amount of deviation between the actual gas pressure in the receiving vessel or tank and the intended gas pressure at the desired ramp rate is a variable deviation from the intended gas pressure.

In yet another embodiment of this invention the amount of permissible deviation between the actual gas pressure in the receiving vessel or tank and the intended gas pressure at the desired ramp rate is a specific pressure deviation from the intended gas pressure.

In yet another embodiment of this invention, the amount of permissible deviation between the actual gas pressure in the receiving vessel or tank and the intended gas pressure at the desired ramp rate is different specific pressure deviations from the intended gas pressure during different periods of the fill cycle.

A pressurized-gas supply system in accordance with this invention includes a source of compressed gas, a delivery conduit adapted to communicate with a receiving vessel for delivering compressed gas to the receiving vessel from the source of compressed gas, a control valve in the delivery conduit operable to control the flow of compressed gas into the receiving vessel, a flow controller for controlling the operation of the supply system to deliver compressed gas from the source of compressed gas to the receiving vessel through the delivery conduit and the control valve at a desired ramp rate, said flow controller being operable to close the control valve in the event of a malfunction resulting in the actual pressure of gas in the receiving vessel deviating from the intended pressure at the desired ramp rate by an undesired amount, and a pressure monitor downstream of the control valve for continuously measuring the actual pressure of gas being directed into the receiving vessel and continuously transmitting data representing that pressure to the flow controller, said flow controller determining the actual pressure of gas flowing into the receiving vessel based upon the measurements from the pressure monitor, comparing the actual pressure with the intended pressure at the desired ramp rate and operating the control valve to a fully closed position if the actual pressure deviates from the intended pressure at the desired ramp rate by an undesired amount.

In a preferred embodiment of this invention the flow controller is a programmable logic controller and data representing the permissible deviation between the actual pressure of the vessel and the intended pressure at the desired ramp rate communicates with the controller.

In a preferred embodiment of this invention the controller is a programmable logic controller operable to control the operation of the supply system to deliver compressed gas from the source of compressed gas to the receiving vessel through the delivery conduit and control valve at a desired ramp rate based upon a predetermined parameter.

In the most preferred embodiment the predetermined parameter on which the desired ramp rate is determined is ambient temperature, and the system includes a transmitter for transmitting to the programmable logic controller data corresponding to the ambient temperature, and the controller is programmed to compare the data representing ambient temperature with other data in communication with the controller and based upon that comparison controlling the operation of the supply system to deliver compressed gas from the source of compressed gas to the receiving vessel through the delivery conduit and control valve at the desired ramp rate.

In a preferred embodiment of this invention the other data compared to the temperature is a preset temperature.

In yet another embodiment of the invention the other data is data including the desired ramp rate at different ambient temperatures.

In the most preferred embodiment of this invention the flow controller is operatively connected to the control valve through an I/P controller.

In one preferred gas supply system in accordance with this invention the source of compressed gas includes a plurality of high-pressure storage vessels including compressed gas therein, and the delivery conduit is in flow communication with one or more of the plurality of high-pressure storage vessels through one or more flow control devices upstream of the control valve.

In certain preferred embodiments of this invention the gas supply system includes a plurality of gas receiving conduits upstream of the delivery conduit; each of the receiving conduits being in flow communication with at least one high-pressure storage vessel for receiving compressed gas from that at least one high-pressure storage vessel and also being in flow communication with a flow-control device upstream of the control valve, each of the receiving conduits being in flow communication with the delivery conduit through a flow-control device, and the flow controller operating one or more flow control devices for controlling the delivery of compressed gas to the receiving vessel through the delivery conduit and the control valve at a desired ramp rate.

BRIEF DESCRIPTION OF THE DRAWINGS

The invention will be described by way of example with reference to the accompanying drawings, in which.

DETAILED DESCRIPTION OF THE INVENTION

Figure 1:
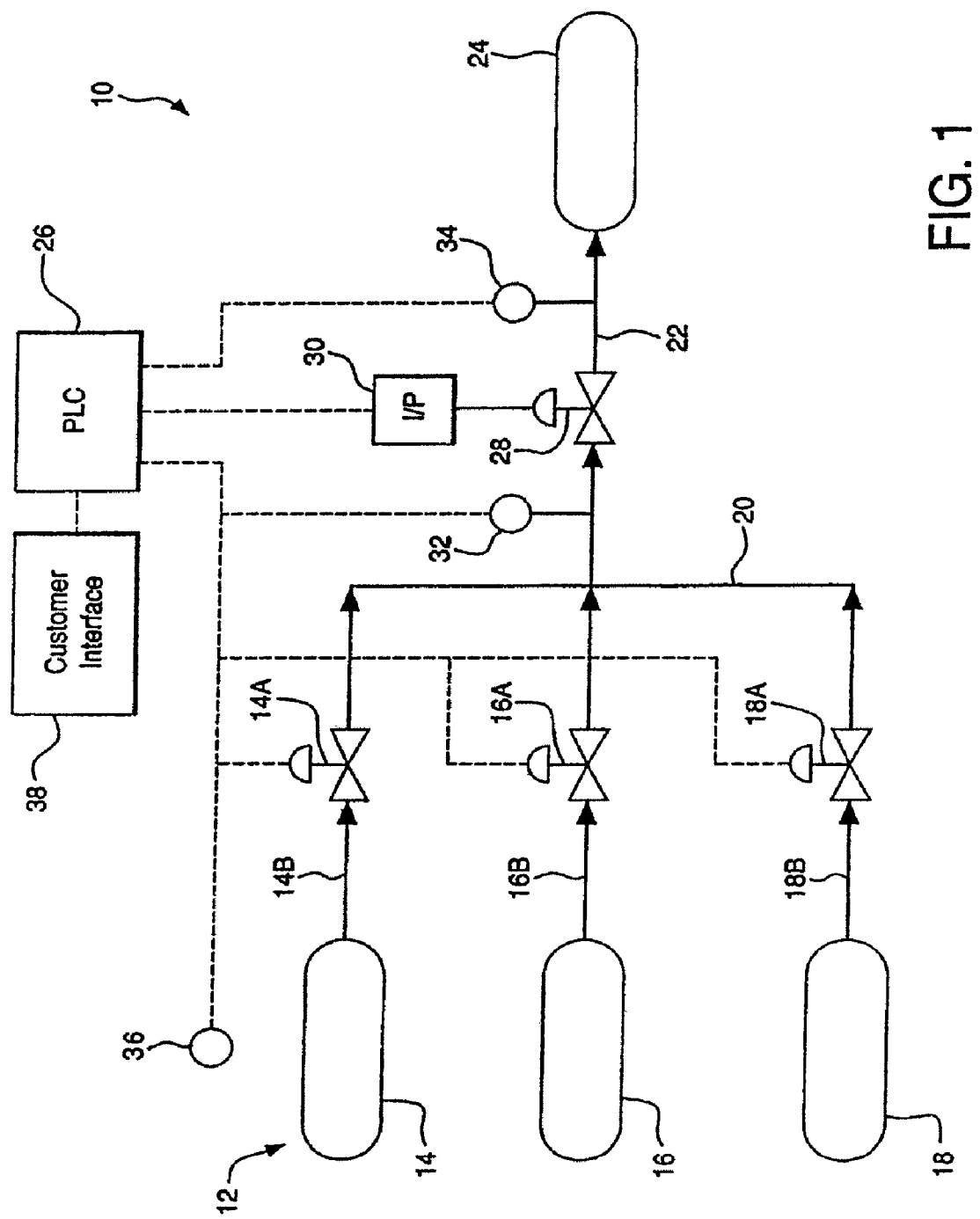
FIG. 1 is a schematic view of a representative pressurized gas supply system including the self-diagnostic features of the present invention.

Referring to FIG. 1, a representative pressurized gas supply system employing the self-diagnostic features of the present invention is illustrated at 10. It should be understood that the specific arrangement of the pressurized gas supply system can be varied within wide limits. The only requirement is that it employ the self-diagnostic feedback system to be described in connection with the pressurized gas supply system 10.

Still referring to FIG. 1, the pressurized gas supply system 10 includes a storage section 12, which, as illustrated, includes three, equal-sized, compressed gas storage vessels 14, 16 and 18. It should be understood that the self-diagnostic features to be described hereinafter can be employed in a pressurized gas supply system including more or less than three storage vessels. Moreover, the storage vessels can be of different volumes, and one or more storage vessels can be cascaded together under the control of a single control valve. In addition, the pressurized gas supply system can include pressurized flow from a single source of compressed gas.

Still referring to FIG. 1, separate flow-control devices, preferably in the form of on-off supply valves 14A, 16A and 18A communicate with storage vessels 14, 16 and 18, respectively, through gas receiving conduits 14B, 16B and 18B, respectively. These on-off valves regulate the flow of compressed gas from the respective storage vessels to a common feed line 20 communicating with a supply line 22 for directing the flow of compressed gas from one or more of the storage vessels to receiving tank or vessel 24. In a preferred embodiment of this invention the receiving tank or vessel 24 can be a fuel tank of a gas-powered car, and the gas employed in the supply system can be either helium or hydrogen, depending upon the gas required to drive the vehicle.

Still referring to FIG. 1, the pressurized gas supply system 10 further includes a programmable logic controller 26 that controls the operation of pressure-control valve 28 through a current/pressure (I/P) controller 30.

In addition, the system includes a pressure transmitter 32 located in supply line 22 upstream of the pressure control valve 28 to indirectly measure the pressure in one or more of the storage vessels 14, 16 and 18 that communicates with the pressure transmitter through opened supply valves 14A, 16A and/or 18A, respectively. The pressure transmitter 32 also can be employed to determine whether the pressure control valve 28 is operating properly. Specifically, the pressure transmitter 32 upstream of the pressure control valve 28 can be employed in conjunction with a second pressure transmitter 34 located in the supply line 22 downstream of the pressure control valve 28 to determine whether the pressure on both sides of the control valve is the same when the valve is intended to be in its fully opened condition, and also to determine whether the flow of gas through the control valve is terminated when the control valve is intended to be in its fully closed position.

Although the pressure transmitter 32 is desirably employed in the pressurized gas supply system 10 of this invention, it is not required, and in fact is not part of the self-diagnostic features of the present invention.

Still referring to FIG. 1, the second pressure transmitter 34 located in the supply line 22 downstream of the pressure control valve 28 indirectly measures the pressure within the receiving tank or vessel 24. The pressure transmitter 34 continuously monitors the pressure on the downstream side of the control valve 28 and transmits a signal representative of the pressure to the programmable logic controller 26 that is intended to control the operation of the pressure control valve 28 through the I/P controller 30 based upon a desired ramp rate of gas flow into the receiving tank or vessel 24. In addition, the I/P controller 30 is controllable by the programmable logic controller 26 to shut off the pressure control valve 28 in the event of a malfunction that results in the pressure in the receiving tank or vessel deviating from the intended pressure at the desired ramp rate by an unacceptable amount, as will be described in detail hereinafter.

The system 10 further includes a temperature transmitter 36 for determining the ambient temperature and transmitting a signal representative of that temperature to the programmed logic controller 26. The programmed logic controller employs the signal representative of the ambient temperature to provide the desired ramp rate of gas flow into the receiving tank or vessel 24. It should be understood that parameters other than ambient temperature can be employed to aid in controlling the desired ramp rate of gas flow into the receiving vessel or tank, and that this invention, in accordance with its broadest aspects, is not limited to using ambient temperature for that purpose.

The system 10 also includes a customer interface 38, which permits the input of certain process and billing parameters by the customer (e.g., credit card receiving mechanisms, input regarding the mass of gas to be delivered to the receiving vessel, etc.).

In a preferred embodiment of this invention the temperature transmitter 36 measures the ambient temperature and employs that temperature to determine the desired ramp rate of gas flow according to predetermined data either within the PLC or transmitted to the PLC by customer interface 38.

Reference throughout this application to any information or data "communicating" with the flow controller 26 includes programming that information or data directly into the flow controller (e.g., when the flow controller is a programmable logic controller or similar device), or feeding that information or data into the controller through another source, such as a remote computer system or other customer interface.

As stated above, the temperature transmitter 36 measures the ambient temperature and directs data representative of that temperature to the PLC to determine the desired ramp rate of gas flow into the receiving tank or vessel 24, based on predetermined data communicating with the PLC. For example, the predetermined data can be data representing a single preset temperature or data representing predetermined desired ramp rates at different ambient temperatures. Commands to adjust I/P controller 30 for the pressure control valve 28 are given by the PLC to maintain the ramp rate at a desired level to prevent overheating of the receiving tank or vessel 24, while filling the receiving tank or vessel within a desired fill time.

The unique feature of this feature resides in a self diagnostic system and method for determining the actual pressure of gas being delivered to the receiving vessel or tank 24 and shutting off the supply of gas to the tank or vessel if that pressure deviates from the intended pressure at the desired ramp rate by more than a permissible amount.

Specifically, the pressure transmitter 34 continuously monitors the pressure of gas being directed into the receiving tank or vessel 24 and transmits data representative of the monitored pressure to the PLC. The PLC also includes data representative of the intended pressure at the desired ramp rate into the receiving tank or vessel 24 based upon the data received from the temperature transmitter 36, and also includes data representative of an acceptable deviation (i.e., range) from that intended pressure. The PLC compares the actual pressure to the acceptable range of pressure and shuts off the supply of gas to the receiving vessel or tank by closing valve 28 if the actual pressure deviates from the intended pressure by more than an acceptable amount.

Turning to FIGS. 2-5, four different techniques are disclosed for setting an acceptable range of pressures during the fill cycle; each technique being based, in part, upon the intended pressure at the desired ramp rate, which is determined by one or more independent parameters, such as ambient temperature.

Figure 2:
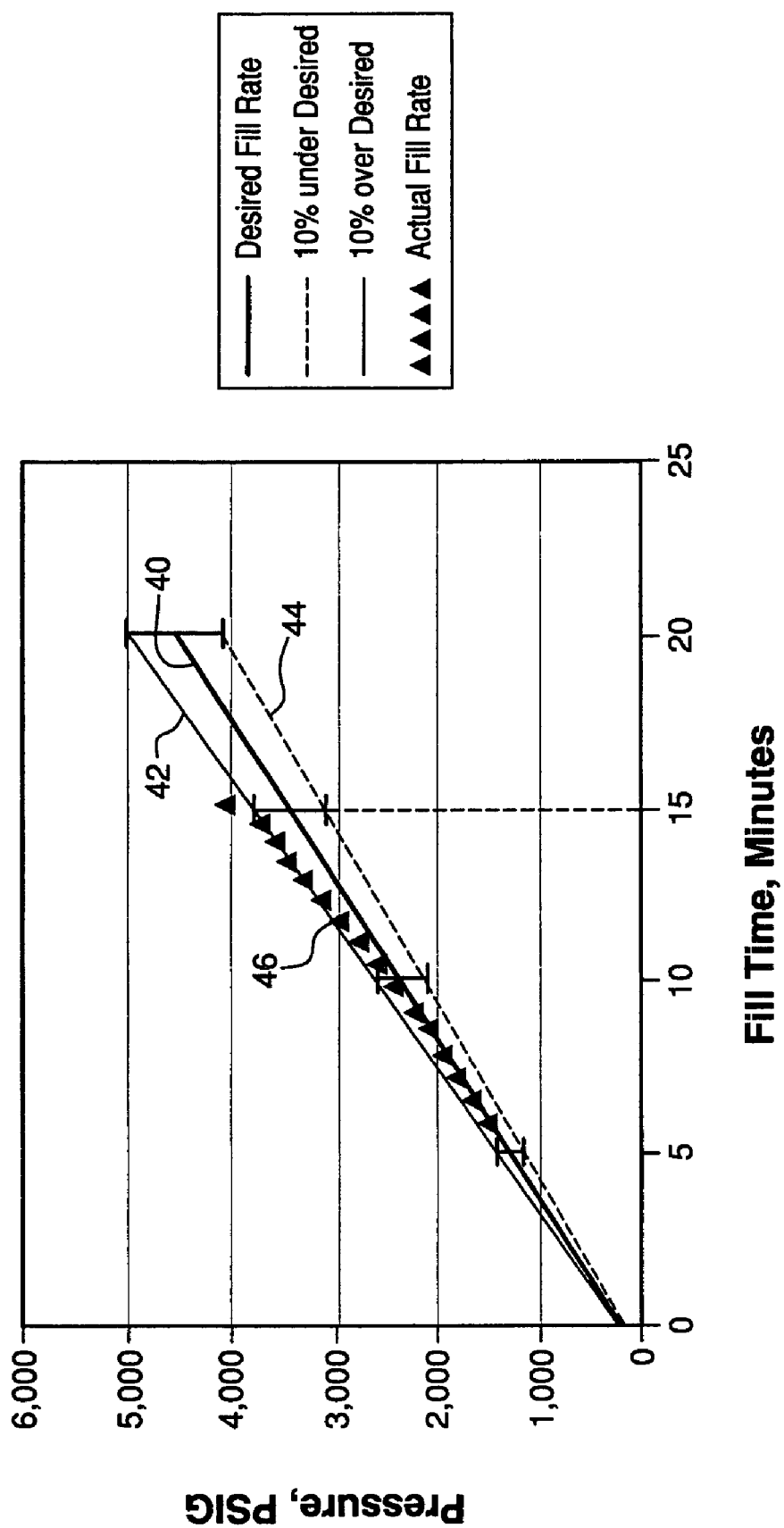
FIG. 2 graphically illustrates one way of setting an acceptable deviation from a desired fill rate.

Referring first to FIG. 2, four separate plots are shown at 40, 42, 44 and 46, respectively. The bold line 40 shows the desired ramp rate during the fill cycle. This ramp rate can be set, for example, by measuring the ambient temperature and feeding data representative of that temperature to the PLC. The PLC compares that data to data programmed into it, such as data representing desired ramp rates at different ambient temperature conditions, and then controlling the valve 28 to set the desired ramp rate. During this stage of operation only one of the three cascade valves 14A, 16A and 18A, which are on/off valves, usually is maintained in an opened condition. However, if desired, more than one of these latter cascade valves can be maintained in an opened condition during the initial setting of the desired ramp rate. It should be noted that the desired ramp rate is set so that the fill rate is not so high as to cause overheating of the receiving tank or vessel 24, and preferably is sufficiently fast to permit the vessel or tank to be filled in a reasonable period of time.

Plots 42 and 44, respectively, constitute fixed percentage deviations (i.e., 10%) from the intended pressure at the desired ramp rate throughout the fill cycle. In the illustrated embodiment, the desired ramp rate is approximately 200 psig per minute (note the rise from approximately 1,000 psig to 2,000 psig over a five-minute period). The upper permissible limit, as reflected by fine-line 42 is illustrated as a ramp rate of approximately 220 psig per minute, and the lower permissible limit, represented by the dashed line 44 is represented as being approximately 180 psig per minute. Thus, at any particular time in the fill cycle there is an acceptable deviation in pressure of 10% from the intended pressure at the desired ramp rate represented by bold line 40. The range of acceptable pressures is between a point on line 42 and a point on line 44 at the identified time in the fill cycle.

Still referring to FIG. 2, a schematic representation of actual fill rate is depicted by the arrowhead line 46. As long as the pressure in the receiving vessel created by the actual fill rate is within an acceptable deviation from the intended pressure at the desired ramp rate, the system 10 will continue to operate. However, in the event that the pressure at the actual fill rate reaches a pressure level outside of the acceptable pressure range, which, for purposes of illustration only, is depicted as taking place 15 minutes into the fill cycle, the PLC 26 will operate the I/P controller 30 to shut off the pressure-control valve 28 and thereby discontinue the flow of pressurized gas into the receiving tank or vessel 24.

Figure 3:
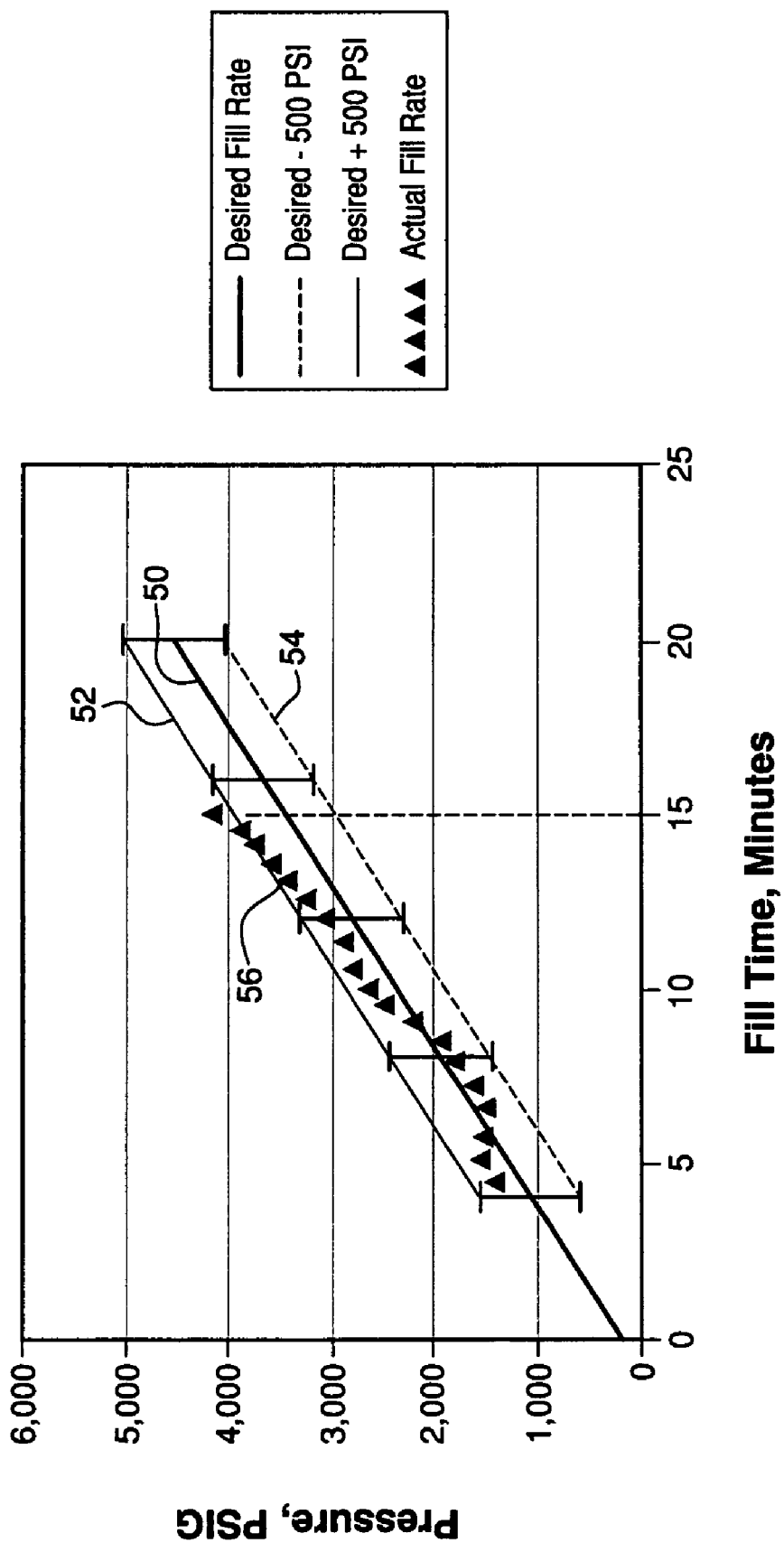
FIG. 3 graphically illustrates another way of setting an acceptable deviation from a desired fill rate.

Turning to FIG. 3, an alternative arrangement for setting an acceptable deviation from a desired fill rate is illustrated. Specifically, the ramp rate at the desired fill rate is indicated by bold line 50. In this embodiment the accepted deviation is determined to be 500 psig above and 500 psig below the intended pressure at the desired ramp rate, throughout the entire fill cycle. The upper and lower limits of this deviation are illustrated by the fine line 52 and the dashed line 54, respectively. As in the FIG. 2 embodiment, the pressure in the receiving tank or vessel 24 at the actual fill rate is represented by the arrow head line 56. As illustrated the actual pressure in the receiving tank or vessel 24 fluctuates both above and below the intended pressure at the desired ramp rate through the initial portion of the fill cycle, but exceeds the upper pressure limit, identified by the fine line 52, at the 15 minute mark in the fill cycle. As described earlier, when the pressure detected in the receiving tank or vessel is outside the acceptable pressure range identified by the lines 52 and 54, the PLC 26 will shut off the pressure control valve 28 through the I/P controller 30 to thereby discontinue the flow of pressurized gas into the receiving tank or vessel 24.

Figure 4:
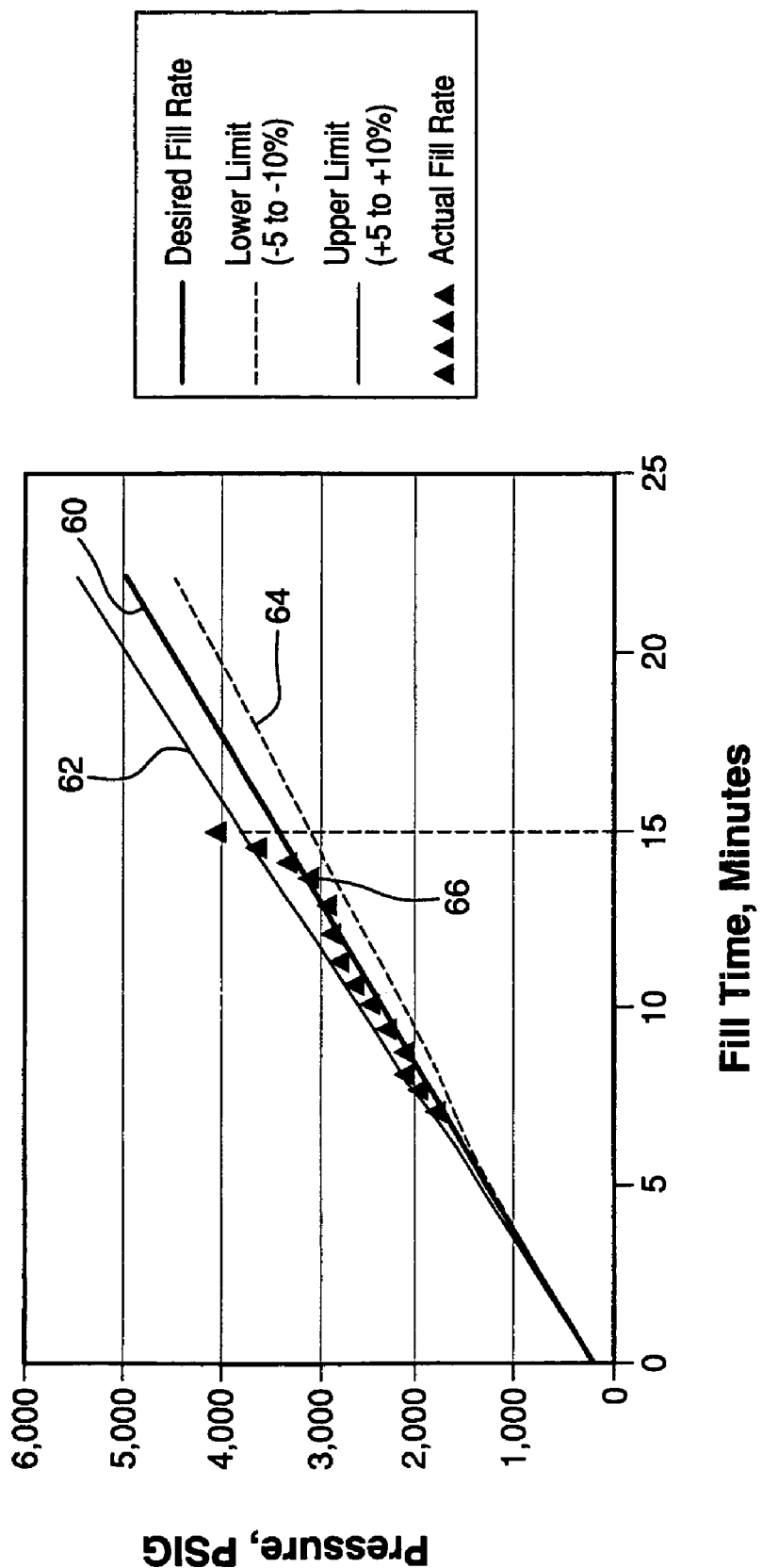
FIG. 4 graphically illustrates yet another way of setting an acceptable deviation from a desired fill rate.

Referring to FIG. 4, an alternative method for setting the acceptable deviation in pressure from the intended pressure at a desired ramp rate is illustrated. In particular, in the FIG. 4 embodiment the desired ramp rate is indicated by bold line 60, the upper acceptable deviation from the pressure at the desired ramp rate is represented by fine line 62 and the lower acceptable deviation from the intended pressure is indicated by the dash line 64. In this illustrated embodiment, the acceptable deviation from the intended pressure is a variable percentage deviation from the intended pressure at the desired ramp rate. In particular, since the rate of temperature rise in the receiving tank or vessel 24 is greater at lower pressures therein, the allowable deviation from the intended pressure at the desired ramp rate is a lower percentage deviation at pressures below a certain level and then increased to a higher percentage deviation at elevated pressures within the supply line 22. In the example illustrated in FIG. 4 the upper and lower pressure limits are based upon a 5% deviation between the intended pressure and actual pressures at supply line 22 below 1,000 psig and gradually increases to a 10% deviation at pressures between the intended pressure and actual pressures at supply line 22 above 1,000 psig.

As illustrated in FIG. 4, when the actual pressure rise during the fill cycle, represented by arrowhead line 66, reaches a level outside of the acceptable deviation range (which in the representative embodiment is illustrated as occurring at approximately 15 minutes into the fill cycle) the PLC 26 will shut off the pressure control valve 28 through the I/P controller 30.

Figure 5:
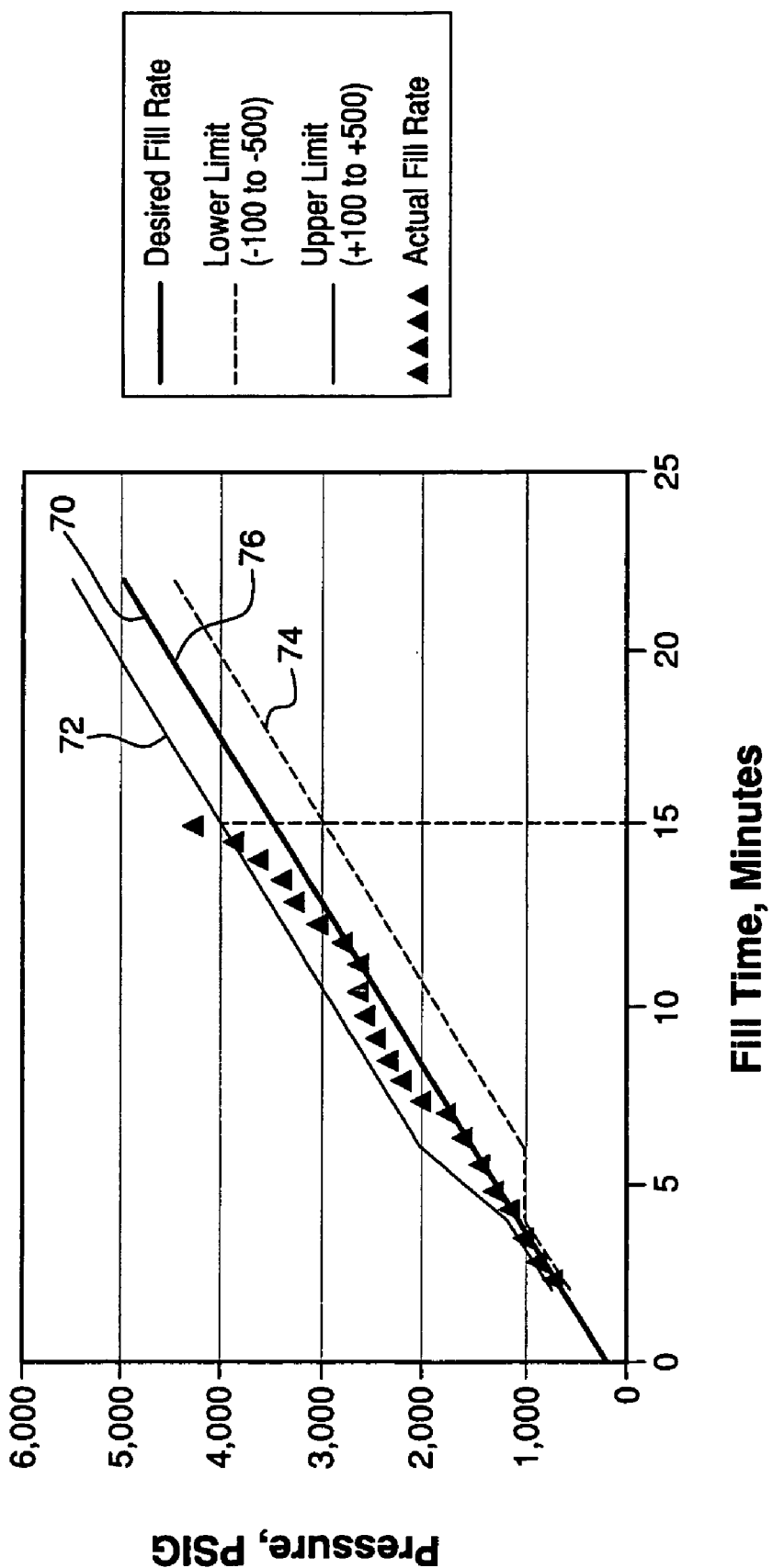
FIG. 5 graphically illustrates yet another way of setting an acceptable deviation from a desired fill rate.

Turning now to FIG. 5, an alternate technique of providing a variable deviation from an intended pressure at a desired ramp rate is disclosed. Specifically, as in the FIG. 4 embodiment, the variable deviation is based upon the intended pressure in the supply line 22 at the intended ramp rate. As illustrated in FIG. 5, the desired ramp rate is indicated by the bold line 70, with the acceptable upper and lower pressure deviations being indicate by the fine line 72 and the dashed line 74, respectively. The acceptable deviations are 100 psig both above and below the intended pressure at the desired ramp rate until the intended pressure in the receiving tank or vessel is 1,000 psig, and at that point, the deviation is gradually increased to plus or minus 500 psig both above and below the intended pressure at the desired ramp rate. The reason for providing this variable ramp rate is the same as discussed above in connection with FIG. 4; namely, to take into account that the rate of temperature rise in the receiving tank or vessel 24 is greater at a lower pressure in the receiving tank or vessel, and therefore, the acceptable deviation from the intended pressure is set within tighter limits during the initial portion of the fill cycle.

Still referring to FIG. 5, the variation in pressure during the actual fill cycle is illustrated by the arrow head line 76, and as represented in the previous embodiments, the actual pressure exceeds the upper acceptable limit at approximately 15 minutes into the fill cycle, resulting in the PLC 26 shutting off the pressure control valve 28 through the I/P controller 30, to thereby discontinue the flow of pressurized gas into the receiving tank or vessel.

It should be understood that the purpose of the self-diagnostic system of this invention is to detect an undesired pressure variation, which generally is indicative of a malfunction of the gas supply system. In particular, during normal operation of the gas supply system, the individual on/off supply valves 14A, 16A and 18A, as well as the variable pressure control valve 28 can be effectively controlled to maintain the actual pressure within acceptable limits of the intended pressure at the desired ramp rate so long as the system is functioning properly. However, in the event of a malfunction, such as a malfunction of the I/P controller 30 to prevent adequate control of the pressure control valve 28, the actual pressure in the supply line 22 can either exceed or fall below the maximum or minimum acceptable pressure, respectively, at any particular point in the fill cycle. If that situation occurs, a malfunction of the gas supply system is assumed, and the PLC 30 is actuated to shut off the pressure control valve 28.

If desired, it is within the scope of this invention to incorporate a delay feature into the system such that the pressure control valve 28 will not be closed unless and until the pressure in the receiving tank or vessel 24, as measured in the supply line 21, remains outside of acceptable pressure limits for a predetermined period of time greater than zero seconds, e.g., 5 seconds. Such a delay feature can be applied when the pressure in the supply line 22 reaches either the upper or lower limit, and remains at or above that limit for a predetermined period of time. By incorporating a predetermined time delay feature into the system a short-duration spike in pressure that is outside the acceptable range for only a short period of time will not result in the supply system being shut down. In other words, if the problem encountered during the fueling process is either a transient or temporary problem caused by an unexplained deviation in the pressure from the pressure at the desired fill rate, the system will not be shut down. However, if the pressure does exceed either the upper or lower acceptable pressure limits, the PLC can be programmed to trigger an alarm, thereby providing an audible signal to an operator of the system that a problem has occurred.

It also should be understood that, although in the preferred embodiment of this invention the acceptable pressure deviation includes both an upper limit above the intended pressure at the desired ramp rate and a lower limit below the intended pressure at the desired ramp rate, the most critical factor is in providing a desired upper limit, since exceeding the upper limit can result in an overheating of the receiving tank or vessel 24. Thus, in accordance with the broadest aspects of this invention the gas supply system can be set to shut off the supply of compressed gas to the receiving tank or vessel 24 only when the actual pressure in the receiving tank or vessel exceeds the intended pressure at the desired ramp rate by an undesired amount; not when the actual pressure falls below the intended pressure at that desired ramp rate. It should be kept in mind that the actual pressure generally will be below the intended pressure at a desired ramp rate when the fill rate is too slow, a situation which, although quite annoying, will not damage the receiving tank or vessel 24.

The following example illustrates the manner in which the present invention can operate, and is provided herein by way of example only, and not by way of limitation.

Assuming that based upon ambient temperature conditions a determination is made that the desired ramp rate should be 5 megapascals (MPA) per minute. Thus, the receiving tank should be at a pressure of 5 MPA at one minute; 10 MPA at two minutes; 15 MPA at three minutes; 20 MPA at four minutes and so on, assuming that the actual ramp rate is the desired ramp rate.

Assuming that an acceptable tolerance is plus or minus 5 MPA from the intended pressure at the desired ramp rate, after one minute if the pressure is above 10 MPA, e.g., 20 MPA, the actual pressure is out of the acceptable tolerance range; thereby evidencing a problem that will cause the PLC 26 to shut the pressure-control valve 28 through the I/P controller 30.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What we claim as the invention:

1. A pressurized gas supply system including:
   a. a source of compressed gas;
   b. a supply line adapted to communicate with a receiving vessel for delivering compressed gas to said receiving vessel from the source of compressed gas;
   c. a control valve in the supply line operable between opened and closed conditions to control the flow of gas through said supply line into the receiving vessel;
   d. a flow controller for controlling the operation of the supply system to deliver compressed gas from the source of compressed gas to the receiving vessel through the supply line and the control valve at a desired ramp rate, said flow controller also being operable to close the control valve in the event of a malfunction resulting in the pressure of gas being directed into the receiving vessel exceeding an upper limit of a percentage deviation that is set relative to an intended pressure at the desired ramp rate;
   e. a pressure monitor downstream of the control valve for continuously measuring the pressure of gas being directed into the receiving vessel and continuously transmitting a signal representative of said pressure of gas to said flow controller, said flow controller comparing the actual pressure of gas with the intended pressure at the desired ramp rate and operating the control valve to a fully closed position if the actual pressure exceeds the upper limit of the percentage deviation.

2. The pressurized gas supply system of claim 1, wherein said flow controller is a programmable logic controller and data representing the undesired amount of deviation communicates with said controller.

3. The pressurized gas supply system of claim 1, wherein said controller is a programmable logic controller operable to control the operation of the supply system to deliver compressed gas from the source of compressed gas to the receiving vessel through the supply line conduit and control valve at a desired ramp rate based upon a predetermined parameter.

4. The pressurized gas supply system of claim 3, wherein said predetermined parameter is ambient temperature.

5. The pressurized gas supply system of claim 4, including a temperature transmitter for transmitting to the programmable logic controller data corresponding to the ambient temperature, said controller being programmed to compare the data corresponding to the ambient temperature with other data in communication with said controller and based upon said comparison controlling the operation of the supply system to deliver compressed gas into the receiving vessel through the supply line and control valve at the desired ramp rate.

6. The pressurized gas supply system of claim 5, wherein said other data is a preset temperature.

7. The pressurized gas supply system of claim 5, wherein said other data is predetermined desired ramp rates at different ambient temperatures.

8. The pressurized gas supply system of claim 1, said flow controller being operatively connected to the control valve through an I/P controller.

9. The pressurized gas supply system of claim 1, wherein said source of compressed gas includes a plurality of high pressure storage vessels including compressed gas therein, said supply line being in flow communication with one or more of the plurality of high pressure storage vessels through one or more flow control devices upstream of said control valve.

10. The pressurized gas supply system of claim 9, including a plurality of gas receiving conduits upstream of said supply line, each of said receiving conduits being in flow communication with at least one high pressure storage vessel for receiving compressed gas from said at least one high pressure storage vessel and also being in flow communication with a flow control device upstream of said control valve, each of said receiving conduits being in flow communication with said supply line through a flow control device, said flow controller operating one or more flow control devices for controlling the delivery of compressed gas to the receiving vessel through the supply line and the control valve at a desired ramp rate.

11. A diagnostic method for a gas supply system, said method including the steps of:
   a. determining a desired ramp rate for filling a gas receiving vessel from a supply of compressed gas;
   b. setting a percentage deviation from an intended pressure at the desired ramp rate, wherein the percentage deviation comprises an upper limit;
   c. continuously monitoring the actual pressure of gas entering said receiving vessel; and
   d. discontinuing the flow of gas into said receiving vessel in the event the actual pressure being monitored exceeds the upper limit.

12. The diagnostic method of claim 11, wherein the step of determining the desired ramp rate is carried out by determining the ambient temperature and setting the ramp rate based on that temperature.

13. The diagnostic method of claim 12, including the step of comparing the actual pressure with the intended pressure at the desired ramp rate in a programmable flow controller and employing said controller to discontinue the flow of gas into said receiving vessel in the event the actual pressure deviates by an undesired amount from the intended pressure at the desired ramp rate.

14. The diagnostic method of claim 11, wherein the step of discontinuing the flow of gas into said receiving vessel is carried out by discontinuing the flow of gas only after the actual pressure deviates from the intended pressure at the desired ramp rate by said undesired amount for a predetermined period of time.

15. The diagnostic method of claim 14, wherein said predetermined period of time is greater than zero seconds.

16. The diagnostic method of claim 11, wherein said percentage deviation is a fixed percentage deviation from the intended pressure throughout the fill cycle.

17. The diagnostic method of claim 11, wherein said percentage deviation is a variable deviation that is varied from the intended pressure at different intended pressure levels.

* * * * *